（12） United States Patent
Reich et al.

(10) Patent No.: US 8,452,576 B2
(45) Date of Patent: May 28, 2013

(54) METHOD, APPARATUS AND COMPUTER PROGRAM FOR SIMULATING BEHAVIOUR OF THERMODYNAMIC SYSTEMS

(75) Inventors: Sebastian Reich, Schwielowsee (DE); Elena Vitalievna Akhmatskaya, Chalfont St. Peter (GB); Ross Howard Nobes, Abington (GB)

(73) Assignee: Fujitsu Limited, Kawasaki (JP)

( * ) Notice: Subject to any disclaimer, the term of this patent is extended or adjusted under 35 U.S.C. 154(b) by 873 days.

(21) Appl. No.: 12/508,716

(22) Filed: Jul. 24, 2009

(65) Prior Publication Data
US 2010/0030534 A1 Feb. 4, 2010

(30) Foreign Application Priority Data
Jul. 28, 2008 (GB) .................................. 0813811.7

(51) Int. Cl.
*G06F 17/10* (2006.01)
*G06F 7/60* (2006.01)

(52) U.S. Cl.
USPC .................................................. 703/5; 703/2

(58) Field of Classification Search
USPC ............................................... 703/2, 5
See application file for complete search history.

(56) References Cited

U.S. PATENT DOCUMENTS

| | | | |
|---|---|---|---|
| 5,619,433 A | 4/1997 | Wang et al. | |
| 6,622,094 B2 * | 9/2003 | Still et al. .......................... | 702/27 |
| 7,231,332 B2 * | 6/2007 | Takeuchi et al. ................... | 703/6 |
| 7,359,841 B1 * | 4/2008 | Hixon ................................. | 703/2 |
| 7,590,514 B1 * | 9/2009 | Olovsson .......................... | 703/6 |
| 2004/0015299 A1 * | 1/2004 | Hefti et al. ....................... | 702/19 |
| 2004/0097782 A1 * | 5/2004 | Korakianitis et al. ........... | 600/16 |
| 2005/0235756 A1 * | 10/2005 | Koenemann .................... | 73/760 |

FOREIGN PATENT DOCUMENTS

| | | |
|---|---|---|
| EP | 1 376 415 | 9/2005 |
| GB | 2 321 542 | 7/1998 |

OTHER PUBLICATIONS

H.M. Jones, E.E. Kunhardt, "Monte Carlo investigation of electron-impact ionization in liquid xenon", The American Physical Society 1993, pp. 9382-9387.*
Search Report issued on priority Unties Kingdom application No. 0813811.7 and dated Dec. 17, 2008.
Akhmatskaya, E. & Reich, S. 2006 , The targeted shadowing hybrid Monte Carlo (TSHMC) method, in B. L. et al, ed., 'New Algorithms for Macromolecular Simulations', vol. 49 of Lecture Notes in Computational Science and Engineering, Springer-Verlag, Berlin, pp. 145-158.
Akhmatskaya, E. & Reich, S. 2008 , GSHMC: An efficient method for molecular simulations, *J. Comput. Phys.* 227, 4934-4954.
Akkermans, R. & Briels, W. 2000, Coarse-grained dynamics of a one chain in a polymer melt, *J. Chem. Phys.* 113, 6409-6422.
Allen, M. & Tildesley, D. 1987, Computer Simulation of Liquids, Clarendon Press, Oxford; Ch 9, pp. 257-269.
Andersen, H. 1980, Molecular dynamics simulations at constant pressure and/or temperature, *J. Chem. Phys.* 72, 2384-2393.

(Continued)

*Primary Examiner* — Dwin M Craig
(74) *Attorney, Agent, or Firm* — Staas & Halsey LLP

(57) ABSTRACT

A method and system thereof for simulating behavior of a thermodynamic system over time, including a momentum refreshment process and a conservative dynamics process, where the momentum refreshment process includes partially refreshing a momentum to define refreshed momentum by considering solutions for a starting momentum determined by a numerical implementation for integrating a generating linear differential equation.

27 Claims, 4 Drawing Sheets

OTHER PUBLICATIONS

Bennett, C. 1976, Efficient estimation of free energy differences from Monte Carlo data, *J. Comput. Phys.* 22, 245-268.

Besold, G., Vattulainen, I., Karttunen, M. & Polson, J. 2000, Towards better integrators for dissipative particle dynamics, *Phys. Rev. E* 62, R7611-R7614.

Birdsall, C. & Langdon, A. 1981, Plasma Physics via Computer Simulations, McGraw-Hill, New York.

Brenner, P., Sweet, C., VonHandorf,D. & Izaguirre, J. 2007, Accelerating the replica exchange method through an efficient all-pair exchange, *J. Chem. Phys.* 126, 074103.

Chipot, C. & Hénin, J. 2005, Exploring the free-energy landscape of a short peptide using an average force, *J. Chem. Phys.* 123, 244906.

Cotter, C.&Reich, S.2003, An extended dissipative particle dynamics model, *Europhys. Lett.* 64, 723-729.

Duane, S., Kennedy, A., Pendleton, B. & Roweth, D. 1987, Hybrid Monte-Carlo, *Phys. Lett. B* 195, 216-222.

Español, P. 1995, Hydrodynamics from dissipative particle dynamics, *Phys. Rev. E* 52,1734-1742.

Español, P. 2003, Dissipative Particle Dynamics, in V. Hark & M. Salas, eds, 'Trends in nanoscale mechanics: Analysis of nanostructure materials and multi-scale modeling', Kluwer, pp. 1-23.

Español, P. & Warren, P. 1995, Statistical mechanics of dissipative particle dynamics, *Europhys. Lett.* 30, 191-196.

Frank, J. & Reich, S. 2003, Conservation properties of Smoothed Particle Hydrodynamics applied to the shallow-water equations, *BIT* 43, 40-54.

Frank, J., Gottwald, G. & Reich, S. 2002, The Hamiltonian particle-mesh method, in M. Griebel & M. Schweitzer, eds, 'Meshfree Methods for Partial Differential Equations', vol. 26 of *Lect. Notes Comput. Sci. Eng.*, Springer-Verlag, Berlin Heidelberg, pp. 131-142.

Frenkel, D. & Smit, B. 2001, Understanding Molecular Simulation, 2nd edn, Academic Press, New York; Ch 17, pp. 465-478.

Gardiner, C. 2004, Handbook on stochastic methods, 3rd edn, Springer-Verlag.

Gingold, R. & Monaghan, J. 1977, Smoothed Particle Hydrodynamics: Theory and application to non-spherical stars, *Mon. Not. R. Astr. Soc.* 181, 375-389.

Greengard, L. & Rokhlin, V. 1987, The fast algorithm for particle simulations, *J. Comput. Phys.* 73, 325-348.

Grmela, M. & Öttinger, H. 1997, Dynamics and thermodynamics of complex fluids. I. Development of a general formalism, *Phys. Rev. E* 56, 6620-6632.

Hafskjold, B., Liew, C. & Shinoda, W. 2004, Can such long time steps really be used in Dissipative Particle Dynamics simulations, *Mol. Sim.* 30, 879-885.

Hockney, R. & Eastwood, J. 1988, Computer Simulations Using Particles, Institute of Physics Publisher, Bristol and Philadelphia.

Hoogerbrugge, P. & Koelman, J. 1992, Simulating microscopic hydrodynamic phenomena with dissipative particle dynamics, *Europhys. Lett* 19, 155-160.

Hoover, W. 1985, Canonical dynamics: Equilibrium phase-space distributions, *Phys. Rev. A* 31, 1695-1697.

Horowitz, A. 1991, *Phys. Lett. B* 268, 247-252.

Izaguirre, J. & Hampton, S. 2004, Shadow Hybrid Monte Carlo: An efficient propagator in phase space of macromolecules, *J. Comput. Phys.* 200, 581-604.

Jarzynski, C. 1997, Nonequilibrium equality for free energy differences, *J. Chem. Phys.* 78, 2690-2693.

Kennedy, A. & Pendleton, B. 2001, Cost of the generalized hybrid monte carlo algorithm for free field theory, *Nucl. Phys. B* 607, 456-510.

Koopman, E. & Lowe, C. 2006, Advantages of a Lowe-Andersen thermostat in molecular dynamics simulations, *J. Chem. Phys.* 124, 204103.

Laio, A. & Parrinello, M. 2002, Escaping free energy minima, *Proc. Natl. Acad. Sci. USA* 99, 12562-12566.

Leimkuhler, B. & Reich, S. 2005, Simulating Hamiltonian Dynamics, Cambridge University Press, Cambridge.

Liu, J. 2001, Monte Carlo strategies in scientific computing, Springer-Verlag; New York.

Lowe, C. 1999, An alternative approach to dissipative particle dynamics, *Europhys. Lett.* 47, 145-151.

Lucy, L. 1977, A numerical approach to the testing of the fission hypothesis, *Astron. J.* 82, 1013-1024.

Lyubartsev, A. & Laaksonen, A. 1995, Calculation of effective interaction potentials from radial distribution functions: A reverse Monte Carlo approach, *Phys. Rev. E* pp. 3730-3737.

Ma, Q.& Izaguirre, J. 2003, Targeted modified impulse—a multiscale stochastic integrator for long molecular dynamics simulations, *Multiscale Modeling and Simulation* 2, 1-21.

Mehlig, B., Heermann, D. & Forrest, B. 1992, Hybrid Monte Carlo method for condensed-matter systems, *Phys. Rev. B* 45, 679-685.

Mori, H. 1965a, A continued fraction representation of the time correlation functions, *Prog. Theor. Phys.* 34, 399-416.

Mori,H.1965*b*,Transport, collective motion and Brownian motion, *Prog. Theor. Phys.* 33,423-455.

Neal, R. 1996, Bayesian learning for neural networks, Springer-Verlag, New York.

Pagonabarraga, I., Hagen, M. & Frenkel, D. 1998, Self-consistent dissipative particle dynamics, *Europhys. Lett.* 42, 377-382.

Peters, E. 2004, Elimination of time step effects in DPD, *Europhys. Lett.* 66, 311-317.

Rothman, D. & Zaleski, S. 1997, Lattice-gas cellular automata, Cambridge University Press, Cambridge.

Salmon, R. 1999, Lectures on Geophysical Fluid Dynamics, Oxford University Press, Oxford.

Shardlow, T. 2003, Splitting for dissipative particle dynamics, *SIAM J. Sci. Comput.* 24,1267-1282.

Succi, S., Karlin, I. & Chen, H. 2002, Colloquium: Role of the H theorem in lattice Boltzmann hydrodynamics simulations, *Reviews of Modern Physics* 74, 1203-1220.

Sweet, C. R., Hampton, S. S. & Izaguirre, J. A. 2006, Optimal implementation of the shadow hybrid Monte Carlo method, Technical report, University of Notre Dame.

Vattulainen, I., Karttunen, M., Besold, B. & Polson, J. 2002, Integration schemes for dissipative particle dynamics simulations: From softly interacting systems towards hybrid models, *J. Chem. Phys.* 116, 3967-3979.

Verlet, L. 1967, Computer experiments on classical fluids. I. Thermodynamical properties of Lennard-Jones molecules, *Phys. Lett.* 159, 98-103.

\* cited by examiner

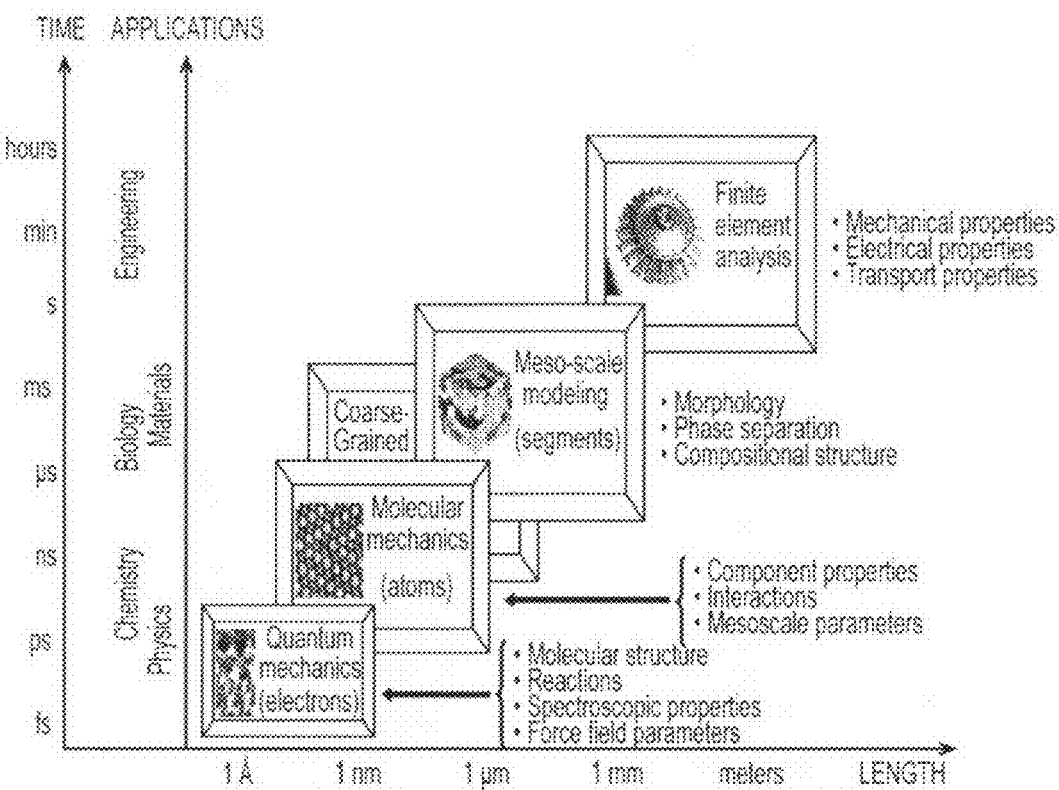
FIG. 1: Hierarchy of Scales
FIG. 2: Meso-scale Modelling Techniques

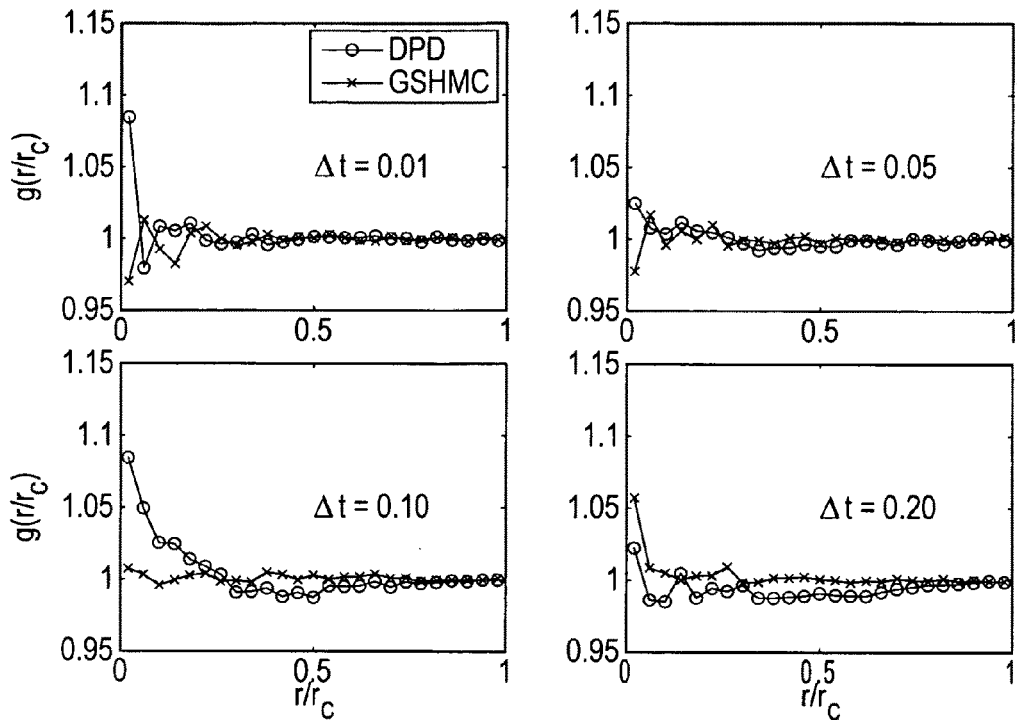
FIG. 3: Model A; Radial Distribution Function
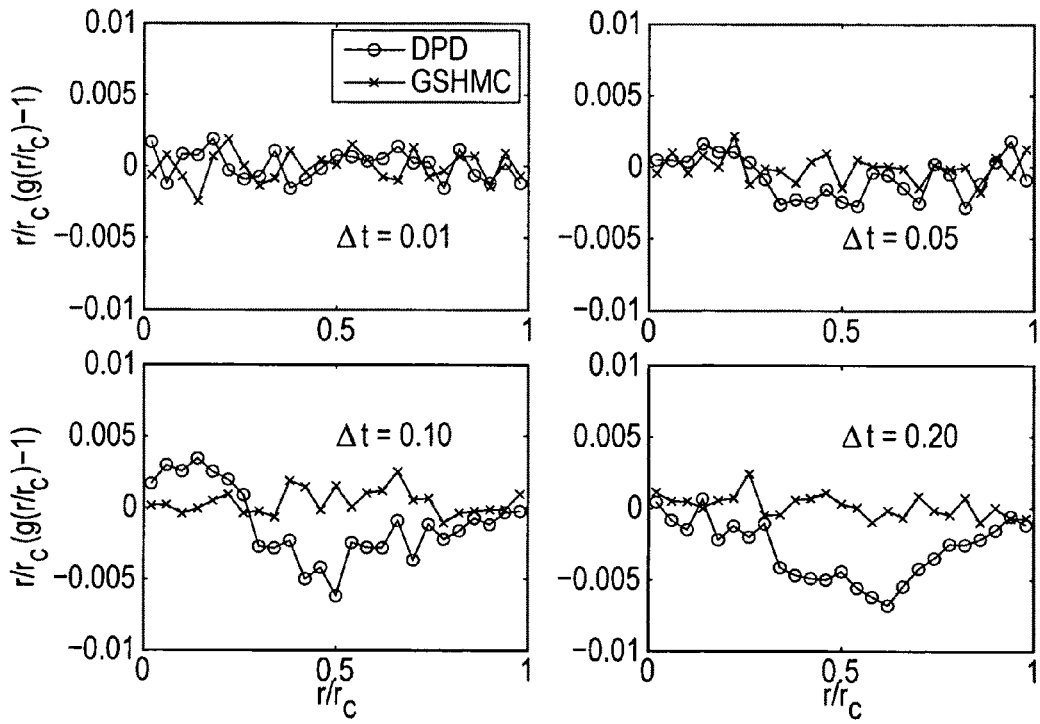
FIG. 4: Model A; Distinguish Statistically from Numerically Induced Deviations

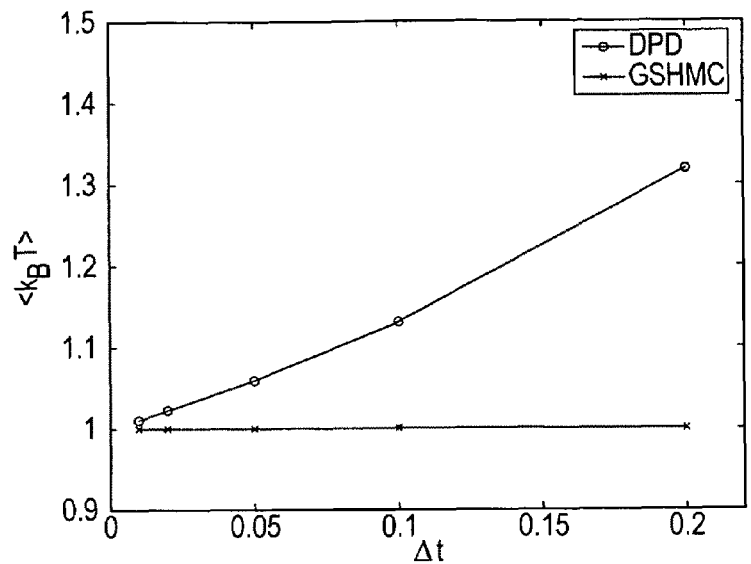
FIG. 5: Model A; Numerically Observed Temperature
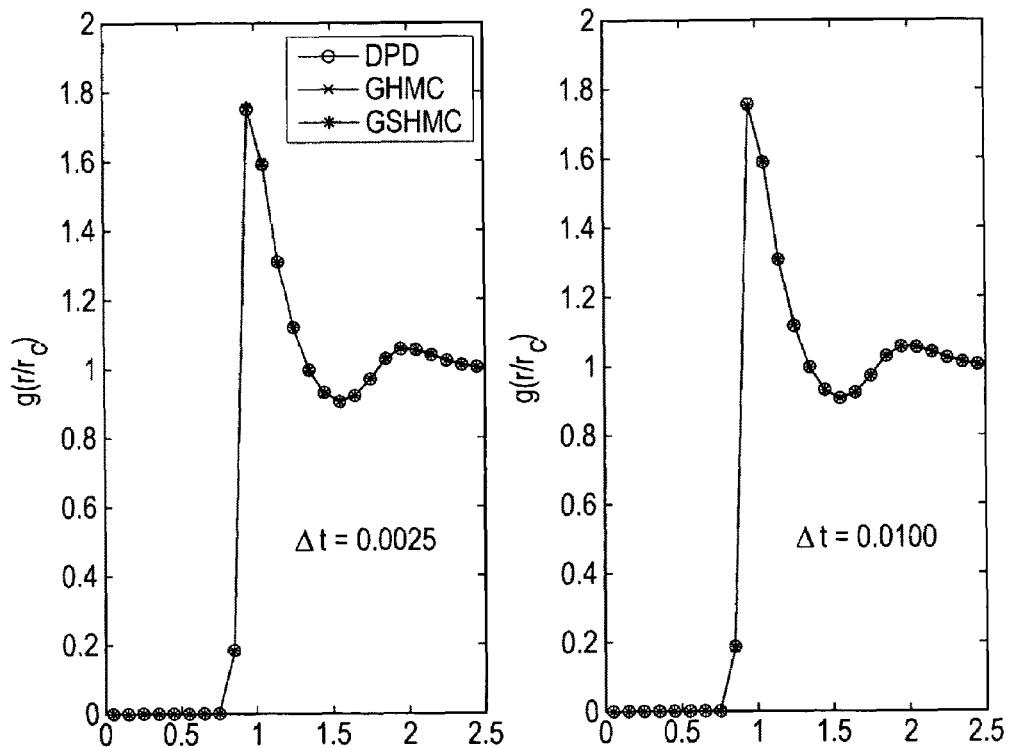
FIG. 6 Model C; Radial Distribution Function

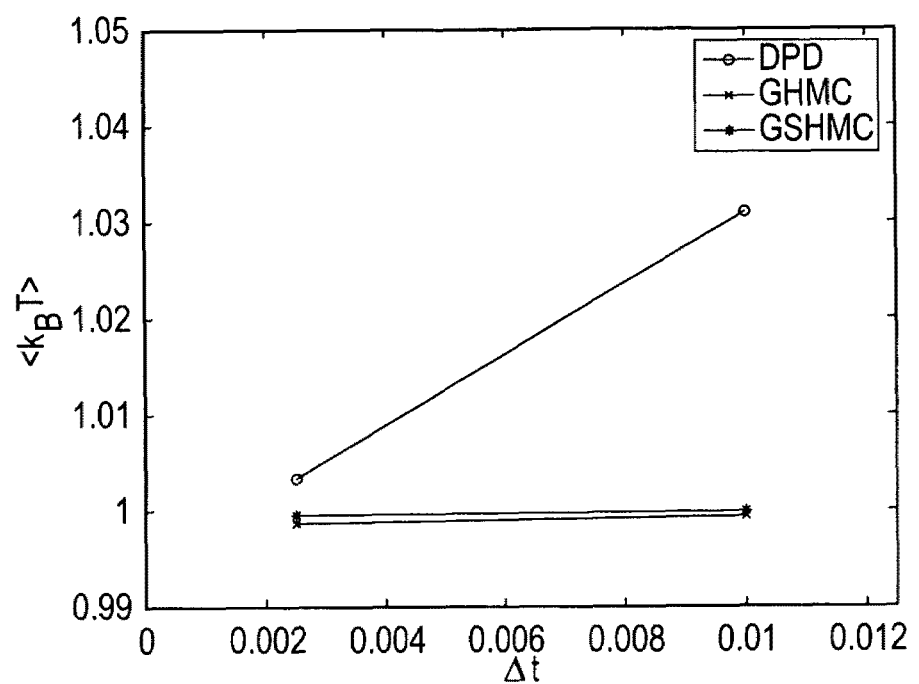
FIG. 7: Model C; Numerically Observed Temperature

METHOD, APPARATUS AND COMPUTER PROGRAM FOR SIMULATING BEHAVIOUR OF THERMODYNAMIC SYSTEMS

CROSS-REFERENCE TO RELATED APPLICATIONS

This application claims the benefit of United Kingdom Application No. 0813811.7, filed Jul. 28, 2008, in the United Kingdom Intellectual Property Office, the disclosure of which is incorporated herein by reference.

BACKGROUND

1. Field

The present invention relates to simulation usable for in-depth investigation of thermodynamic processes.

2. Description of the Related Art

Generally, according to the time-scale and to the physical scale which is to be simulated, different simulation techniques are suitable. FIG. 1 is a diagrammatic illustration of different kinds of modelling used as the time for modelling and size of the model increase. At the lower end, quantum mechanics takes more of a scientific rather than a practical approach to model in the area of Angstrom units and picoseconds. Generally this area of modelling deals with individual electrons and molecular mechanics deals with atoms. Continuing up the scale, coarse-grained modelling refers to models in which a few atoms which are close in terms of their properties are considered together as one "particle" (or group of atoms determined by the simulation parameters). Approximately the same approach can be taken with meso-scale modelling, in which maybe hundreds of atoms can be clustered to form one particle. Coarse-grained modelling is appropriate from sizes of a few Angstrom units to sizes of a few micrometers. Meso-scale modelling on the other hand can be interpreted as modelling on the scale of tens of nanometers to millimeters. The reader will appreciate the overlap between these two approximate scales. Finally, finite element analysis works on a continuum basis rather than with particles and is a more practical way of investigating properties of larger systems.

The present application is particularly, although not exclusively, concerned with coarse-grained and meso-scale modelling. These scales can be seen as the transitional regions between macroscopic and microscopic regimes. In such areas, atomistic methods such as molecular dynamics can be too expensive, whereas continuum solvers such as finite element analysis neglect the microstructure, which could lead to inaccurate results.

There are many phenomena which occur at meso-scales and merit careful study using simulation. Fluid mixture properties, such as emulsions, surfactants and phase separation in complex fluids can be investigated at meso-scale. Colloid suspensions with their aggregation clustering and dispersion are another area of interest. Also, the characteristics of a polymeric solution, such as melting characteristics and the behaviour of a dense solution are well suited to meso-scale modelling. These are just a few of the areas of application.

FIG. 2 illustrates different meso-scale modelling techniques currently proposed for meso-scale modelling. Of these, the most common is probably Dissipative Particle Dynamics.

Dissipative particle dynamics (DPD) has become a powerful and popular method to perform meso-scale simulations. DPD represents an intermediate position between all-atom molecular dynamics (MD) and Navier-Stokes equations. As its name suggests, DPD is particle based. Its computational cost scales linearly with the number of particles if the DPD algorithm is properly implemented, and hence very large systems can be simulated. The method can be used in complex-geometry domains. On a mathematical level, DPD generally predicts the behaviour of systems consisting of particles which are interacting through a combination of conservative, dissipative and fluctuation forces. Newton's laws are thus observed. Moreover, DPD can give an accurate prediction of hydrodynamic behaviour.

Despite its advantages, DPD has certain practical problems. Commonly used integration schemes in DPD lead to distinct deviations from the true equilibrium behaviour, including deviations from the temperature predicted by the fluctuation-dissipation theorem. None of the existing numerical implementations of DPD can reproduce correctly the simulation temperature under the full DPD dynamics. Thus, increases in the time-step used lead to a higher temperature and changes in all the thermodynamic properties dependent on temperature. Since the fluctuation-dissipation terms in DPD can be comparable to the conservative contributions, the non-preservation of thermodynamic equilibrium properties poses a serious obstacle for practical simulations.

A similar problem arises in classical molecular simulations when performing simulations under constant temperature.

Specifying the temperature in molecular dynamics (MD) simulations for example, involves a thermostat that represents the coupling of the molecular degrees of freedom to a "heatbath". Thermostats can be categorized as either local or global. The simplest local thermostat is provided by Andersen's thermostat (Andersen, 1980), while the most common global thermostat is the Nosé-Hoover thermostat (Hoover, 1985).

From a physical point of view the local approach seems more realistic since it avoids a global coupling of all molecular degrees of freedom through extended "heatbath" variables. Rigorous constant-temperature sampling methods have been devised in the context of Monte Carlo methods, and a thermodynamically consistent implementation (i.e. free of numerical time-stepping artifacts) of Andersen's thermostat is provided by the hybrid Monte Carlo (HMC) method (Duane et al., 1987) and the generalized hybrid Monte Carlo (GHMC) method (Kennedy & Pendleton, 2001).

These methods are based on a hybrid of two long-established molecular simulation methods, molecular dynamics (MD) and Monte Carlo (MC). In MD, particles interact deterministically over a time period under known laws of physics whereas in MC conformations are accepted (or rejected) with a probability governed by a so-called Metropolis test involving positions and momenta.

The computational efficiency of HMC has been improved through the work of Izaguirre and co-workers (Izaguirre & Hampton, 2004; Sweet et al., 2006). Similar improvements have been achieved for the GHMC method by Akhmatskaya & Reich (2006, 2008), which have led to the generalized shadow hybrid Monte Carlo (GSHMC) method (Akhmatskaya & Reich, 2008).

In GSHMC the acceptance rate of the dynamics part of the GHMC is improved through the use of modified energies in the Metropolis test. The GSHMC method allows for efficient sampling of phase space for large molecular systems and can be used as a powerful simulation tool in a wide range of applications. It outperforms other popular simulation techniques such as classical MD and the standard hybrid MC in terms of sampling efficiency.

Even though these molecular simulation methods provide thermodynamically consistent implementations of constant-temperature molecular dynamics, they are not suitable for meso-scale simulations since the fluctuation-dissipation contributions are not applied in a dynamically consistent manner. The reason for this is that the momentum refreshment step of GHMC/GSHMC does not respect the Galilean invariance (Newton's third law) of the underlying force fields. Galilean invariance is a principle of relativity which states that the fundamental laws of physics are the same in all inertial frames. Galilean invariance is one of the key requirements for simulation methods adopted in meso-scale modelling, because the collective motion of the particles at this scale is more important, so that it is the co-operative nature of the simulated system which requires modelling.

Most local thermostats do not respect the Galilean invariance of the molecular force field, which implies conservation of total and angular momentum. This limitation has been overcome by the Lowe-Peters-Andersen thermostat (Lowe, 1999; Peters, 2004). It has also been found (Koopman & Lowe, 2006) that the Lowe-Peters-Andersen thermostat reduces the artificially induced viscosity compared to the Andersen thermostat at equal collision rates, which implies faster diffusion of particles in phase space. However, the Lowe-Peters-Andersen method cannot reproduce correctly thermodynamic quantities independently of time step in MD under DPD.

It is desirable to overcome the disadvantages of the prior art, particularly in the coarse-grain and meso-scale simulation areas.

SUMMARY

According to an embodiment of the invention, there is provided a method of simulating behaviour of a thermodynamic system over time, comprising a momentum refreshment process and a conservative dynamics process. The momentum refreshment process includes partially refreshing a momentum to define refreshed momentum by considering solutions determined by a numerical implementation for integrating a generating linear differential equation.

In an embodiment, the first operation is the momentum refreshment. In some cases, it can give faster convergence to start the simulation operation with the momentum refreshment rather than the conservative dynamics iterations. The entire method (process) may be repeated a selected number of times or until a preferred result in terms of system energy or stability is achieved.

An embodiment includes introduction of multiple momentum refreshment, which repeats the entire momentum refreshment operation a selected number of times consecutively to provide a final resulting momentum. The multiple refreshment operation effectively chooses the best option for the selected number of momentum refreshment operations. This simple modification to the method (process) allows improvement of an acceptance rate in a subsequent Metropolis function and at relatively low cost in terms of processing power and/or time.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 1 is a graph comparing different modelling methods;

FIG. 2 is a schematic diagram of meso-scale modelling techniques;

FIG. 3 shows a radial distribution function $g(r/r_c)$ for different values of the step-size $\Delta t$ in model A;

FIG. 4 shows $(r/r_c) (g(r/r_c)-1)$ for the different step-sizes and methods to distinguish statistically from numerically induced deviations of $g(r/r_c)$;

FIG. 5 shows the radial distribution function $g(r/r_c)$ for different values of the step-size $\Delta t$ in model C;

FIG. 6 shows the numerically observed temperature $\langle k_B T \rangle$ vs the step-size $\Delta t$ in Model C; and FIG. 7 shows the numerically observed temperature $\langle k_B T \rangle$ vs the step-size $\Delta t$ in Model A.

DETAILED DESCRIPTION OF EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

A method and system of simulating behaviour of a thermodynamic system over a period of time. The method includes a momentum refreshment process and a conservative dynamics process, where the momentum refreshment process includes partially refreshing a momentum to define refreshed momentum by considering solutions determined by a numerical implementation for integrating a generating linear differential equation.

In an embodiment, issue(s) associated with generating linear differential equation is solved using the implicit mid-point rule. This has an advantage including for some situations that the refreshed momentum can be accepted automatically without a Metropolis acceptance step. This advantage is not however available where the method uses a shadow Hamiltonian rather than a true Hamiltonian for reference system energy calculations.

In other preferred embodiments these shadow Hamiltonians are used to calculate system energy as asymptotic expansions of the true Hamiltonian step-size $\Delta t$. Here, some re-weighting is needed for high accuracy. The shadow Hamiltonian is a more sensitive indicator than the true Hamiltonian of drift in the energy caused by instability, in that it can eliminate some of the noise in true Hamiltonian values. Nevertheless for accurate results, re-weighting of the calculated properties of the system is needed at the end of the method.

An additional strategy for increasing an acceptance rate of the momentum refreshment is to introduce an appropriate transformation in the momentum vector p using a map that is invertible in the momentum vector p. Such a transformation is particularly suitable for mitigating the lowered acceptance rate of the momentum refreshment process which is a drawback of using shadow Hamiltonians.

As will be appreciated from the following detailed sections, one distinction of invention embodiments over the known/related art simulation methods is a newly developed (local) momentum refreshment Monte Carlo step, which conserves the Boltzmann velocity distribution as well as total linear and angular momentum. Surprisingly, the present inventors have managed to create a link between DPD and hybrid MC methods based on the GHMC/GSHMC methods and thus combine some of the advantageous aspects of both. Embodiments of the invention therefore increase the possibilities for investigation of thermodynamic processes that involve the co-operative nature of simulated systems and that are outside the time-scale and length-scale ranges of atomistic methods.

Moreover, invention embodiments include the enhanced sampling abilities of the GHMC/GSHMC methods, reproduce thermodynamic quantities independently of the time step in MD and have the ability to control transport properties.

The Galilean invariance of the novel momentum refreshment Monte Carlo step is important for non-equilibrium simulations on a meso-scale level where particles represent collective molecular degrees of freedom (Español, 1995). Thus meso-scale material simulations are the primary application area for the novel GHMC method. For that reason, embodiments of the new method are referred to herein as meso-GHMC or meso-GSHMC, even if they can also be used in coarse-grain scale simulations.

Mesoscopic phenomena of so-called "soft matter" physics, embracing a diverse range of systems including liquid crystals, colloids, and biomembranes, are typically not accessible to traditional simulation techniques such as molecular dynamics (on the microscopic level) or reaction-diffusion equations (on the macroscopic continuum level). The development of appropriate mesoscopic model description has been a very active area for research over the last decade. Most approaches rely on some form of "coarse graining" from the microscopic atomic description of soft matter. The resulting models can be roughly classified as either being particle-based (in which case particles no longer present individual atoms) or kinetic density-based models (in which case we obtain a continuum or lattice-based description). Meso-GHMC and meso-GSHMC will be applicable to a wide range of particle-based meso-scale models (Español, 2003).

Constant temperature molecular dynamics simulations provide another potential application area for meso-GHMC. In this context, it should be noted that the Andersen thermostat (as well as the HMC and GHMC methods) induce a form of "artificial" viscosity into the system, which reduces diffusion of particles in phase space, i.e., their "exploration" of phase space (Frenkel & Smit, 2001). This artificial viscosity increases with the collision frequency of the Andersen thermostat while, on the other hand, a high collision rate is desirable for keeping the system close to the target temperature. These two conflicting issues need to be balanced in practice by an appropriate choice of the collision frequency.

Numerical experiments (following Vattulainen et al., 2002) have been conducted to confirm that embodiments of the invention using meso-GHMC as well as meso-GSHMC methods reproduce thermodynamic quantities for constant number of particles, constant volume, and constant temperature (NVT) ensemble. Deviations from analytic values are only due to finite sample size statistical fluctuations, but do not depend on discretization parameters such as time-step and collision frequency.

We describe the generalized hybrid Monte Carlo (GHMC) algorithm of Kennedy & Pendleton (2001) for a Hamiltonian (energy function).

$$\mathcal{H}(r, p) = \frac{1}{2} p^T M^{-1} p + V(r), \tag{1}$$

with position vector $r \in \mathbb{R}^{3N}$ and momentum vector $p \in \mathbb{R}^{3N}$, N the number of atoms, $M \in \mathbb{R}^{3N \times 3N}$ the (diagonal) mass matrix, and $V: \mathbb{R}^{3N} \to \mathbb{R}$ the potential energy function.

We begin by recalling that a Markov process will converge to some distribution of configurations if it is constructed out of updates each of which has the desired distribution as a fixed point, and which taken together are ergodic. The GHMC algorithm for the generation of the canonical density function $$\rho(r,p) \propto \exp(-\beta \mathcal{H}(r,p)), \text{ with } \beta = 1/k_B T, \tag{2}$$

is constructed out of two such steps (Kennedy & Pendleton, 2001).

Hamilton's equations of motion $$\dot{r} = M^{-1} p, \dot{p} = -\nabla_r V(r), \tag{3}$$

are numerically approximated with the leapfrog/Störmer-Verlet method $$p^{n+1/2} = p^n - \frac{\Delta t}{2} \nabla_r V(r^n), \tag{4}$$

$$r^{n+1} = r^n + \Delta t M^{-1} p^{n+1/2}, \tag{5}$$

$$p^{n+1} = p^{n+1/2} - \frac{\Delta t}{2} \nabla_r V(r^{n+1}) \tag{6}$$

over L steps and step-size $\Delta t$

The resulting map $U_\tau: (r, p) \to (r', p')$, $\tau = L\Delta t$, preserves volume and is time-reversible. Finally, a Metropolis accept/reject test of the form $$(r', p') = \begin{cases} U_\tau(r, p) & \text{with probability } \min(1, \exp(-\beta \delta \mathcal{H})) \\ (r, -p) & \text{otherwise,} \end{cases} \tag{7}$$

with $$\delta \mathcal{H} := \mathcal{H}(U_\tau(r, p)) - \mathcal{H}(r, p) \tag{8}$$

is applied.

Introducing momentum flip $F: (r, p) \to (r, -p)$ in (7) provides the validity of the standard detailed balance condition $$A(\Gamma'|\Gamma)\rho(\Gamma) = A(\Gamma|\Gamma')\rho(\Gamma'), \tag{A}$$

which in turns verifies the stationarity of a probability density function (PDF) $\rho(\Gamma)$ under a given Markov chain, i.e.:

$$\rho(\Gamma') = \int_\Omega A(\Gamma'|\Gamma)\rho(\Gamma) d\Gamma, \tag{B}$$

where the state space of a Markov chain, $\Omega \subset \mathbb{R}^n$, consists of states $\Gamma \in \Omega$, and its transition probability kernel is $A(\Gamma'|\Gamma)$. $\Gamma'$ are proposal states.

The momentum vector p is now mixed with a normal (Gaussian) i.i.d. distributed noise vector $\Xi \in \mathbb{R}^{3N}$ and the partial momentum refreshment process is given by $$\begin{pmatrix} p' \\ \Xi' \end{pmatrix} = \begin{pmatrix} \cos(\alpha) & -\sin(\alpha) \\ \sin(\alpha) & \cos(\alpha) \end{pmatrix} \begin{pmatrix} p \\ \Xi \end{pmatrix} \tag{9}$$

where $$\Xi = \beta^{-1/2} M^{1/2} \xi, \tag{10}$$
$$\xi = (\xi_1, \ldots, \xi_{3N})^T,$$
$$\xi_i \sim N(0, 1),$$
$$i = 1, \ldots$$

and $0 < \alpha \leq \pi/2$ is an appropriate angle. Here N(0, 1) denotes the normal distribution with zero mean and unit variance.

If p and Ξ are both distributed according to the same normal (Gaussian) distribution, then so are p' and Ξ'. The special property of Gaussian random variables under an orthogonal transformation (9) makes it possible to conduct the partial momentum refreshment process without a Metropolis accept/reject test. See Kennedy & Pendleton (2001) for details.

The present inventors have come to the realisation that it is possible to carry out a GHMC simulation without requiring the standard momentum flip.

For high rejection rates the momentum flip in GHMC leads to an undesirable Zitterbewegung (going forward and backward) in the molecular trajectories. This has been identified by Horowitz, 1991 as the main obstacle to achieve higher sampling effiency under the GHMC method compared to the HMC method.

We should stress that a standard detailed balance relation (A) is stronger than (B) and one might search for conditions alternative to (A) which still implies (B), i.e., implies the stationarity of $\rho(\Gamma)$ under a given Markov chain, but eliminates the need for the additional momentum flip in GHMC. Of particular interest to us are Markov chains that allow for a map (involution) F: $\Omega \to \Omega$, which satisfies (i) $F=F^{-1}$ and (ii) $\rho(\Gamma)=\rho(F\Gamma)$ for all $\Gamma \in \Omega$.

In Gardiner "Handbook on Stochastic Methods", 2004 one finds the following detailed balance condition for systems satisfying an involution F:

$$A(\Gamma'|\Gamma)\rho(\Gamma) = A(F\Gamma|F\Gamma')\rho(F\Gamma') = A(F\Gamma|F\Gamma')\rho(\Gamma') \quad (C)$$

in the context of the Fokker-Planck equation. Condition (C) implies (B) since $$\int_\Omega A(\Gamma'|\Gamma)\rho(\Gamma)d\Gamma = \rho(\Gamma')\int_\Omega A(F\Gamma|F\Gamma')d\Gamma = \rho(\Gamma').$$

We now generalize the modified detailed balance relation (C) to Markov chain Monte Carlo (MCMC) methods. This will of course apply to a GHMC method, which is a MCMC method for systems of interacting particles with position $r_i \in R^3$, momentum $p_i \in R^3$, and mass $m_i$, $i=1,\ldots,N$. The phase space is $\Omega = R^{6N}$ and the state variable is given by $$\Gamma = (r_1^T, \ldots, r_N^T, p_1^T, \ldots, p_N^T)^T,$$

the involution (momentum flip) F is provided by $$F\Gamma = (r_1^T, \ldots, r_N^T, -p_1^T, \ldots, -p_N^T)^T,$$

the canonical distribution at temperature T is then given by (2) and an energy function H is defined in (1). We obviously have $\rho(\Gamma)=\rho(F\Gamma)$.

Let $T(\Gamma'|\Gamma)$ denote the proposal distribution of a MCMC method and let us assume that the state space $\Omega$ permits an involution F. A proposal state $\Gamma'$ is accepted according to the Metropolis-Hastings criterion $r(\Gamma',\Gamma) \geq \xi$, where $\xi \in [0,1]$ is a uniformly distributed random number and $$r(\Gamma',\Gamma) = \frac{\delta(\Gamma',\Gamma)}{\rho(\Gamma)T(\Gamma'|\Gamma)},$$

where $\delta(\Gamma',\Gamma)$ is any function with $$\delta(\Gamma',\Gamma)=\delta(F\Gamma,F\Gamma')$$

that makes $r(\Gamma',\Gamma) \leq 1$.

The probability for the induced Markov chain to make a transition from $\Gamma$ to $\Gamma'$ is now given by $$A(\Gamma'|\Gamma) = T(\Gamma'|\Gamma)r(\Gamma',\Gamma) = \rho(\Gamma)^{-1}\delta(\Gamma',\Gamma).$$

Similarly, $$A(F\Gamma|F\Gamma') = T(F\Gamma|F\Gamma')r(F\Gamma,F\Gamma')$$
$$= \rho(F\Gamma')^{-1}\delta(F\Gamma,F\Gamma')$$
$$= \rho(\Gamma')^{-1}\delta(\Gamma',\Gamma)$$

and the modified detailed balance relation (C) follows. One can choose, for example, $$\delta(\Gamma',\Gamma) = \min\{\rho(\Gamma)T(\Gamma'|\Gamma), \rho(\Gamma')T(F\Gamma|F\Gamma')\}$$

and, $$r(\Gamma',\Gamma) = \min\left(1, \frac{T(F\Gamma|F\Gamma')\rho(\Gamma')}{T(\Gamma'|\Gamma)\rho(\Gamma)}\right).$$

If the proposal distribution satisfies $$T(\Gamma',\Gamma)=T(F\Gamma,F\Gamma'),$$

then we obtain the simpler (Metropolis) formulation $$r(\Gamma',\Gamma) = \min\left(1, \frac{\rho(\Gamma')}{\rho(\Gamma)}\right).$$

Several algorithms are special cases of GHMC:
The usual hybrid Monte Carlo (HMC) algorithm is the special case where $\alpha=\pi/2$. The momentum reversal in case of a rejected conservative dynamics part may be ignored in this case since $p'=\Xi$ in (9) and the previous value of p is entirely discarded.

Langevin Monte Carlo algorithms correspond to L=1; i.e., a single conservative dynamics time-step with $\tau=\Delta t$, and an arbitrary $0<\alpha\leq\pi/2$ Langevin Monte Carlo recovers stochastic Langevin molecular dynamics (Allen & Tildesley, 1987)

$$dr=M^{-1}pdt, dp=-[\nabla_r V(r)+\gamma p]dt-\sigma dW, \quad (11)$$

provided $\alpha=(2\gamma\Delta t)^{1/2}$, $\gamma>0$ is a constant, $\sigma$ is determined by the standard fluctuation-dissipation relation (Allen & Tildesley, 1987), and W is a vector of independent Wiener processes. In this regime, we find that (9) reduces to $$p'-p \approx -\gamma\Delta t p-(2\gamma\Delta t)^{1/2}\Xi, \quad (12)$$

provided that $\alpha<<1$, and one may view the GHMC algorithm as a means to simulate stochastic molecular dynamics (instead of using GHMC as a pure sampling device).

The single conservative dynamics step (L=1) may be replaced by a small number of steps such that the resulting $\alpha=(2\gamma L\Delta t)^{1/2}$ still satisfies $\alpha<<\cdot 1$ for a given $\gamma$.

The inventors have proposed an extension of the GHMC method to position-dependent momentum refreshment operations.

The new meso-GHMC can make use of a modified detailed balance relation (Gardiner, 2004) to eliminate the momentum flip in the conservative dynamics part of GHMC as explained above. See the algorithmic summary provided below. However, it is also possible to keep the conservative dynamics part as described above, so that the momentum flip is retained.

The inventors have been able to realise that (9) can be viewed as the solution to the linear differential equation $$\frac{dp}{ds} = -\Xi, \quad \frac{d\Xi}{ds} = p, \quad (13)$$

at $s=\alpha$ with initial conditions $p(0)=p$ and $\Xi(0)=\Xi$. We call (13) the generating differential equation for the momentum proposal (9). This equation, and its generalisation shown below is close to the DPD equations set out in detail later in this text and the inventors came to the realisation that such differential expressions can form a link to DPD.

Alternative momentum proposal steps can be now be devised by different choices of the generating differential equation. One can, for example, use the more general formulation $$\frac{dp}{ds} = -B\xi, \quad \frac{d\Xi}{ds} = B^T M^{-1} p, \quad (14)$$

with $\xi(0) = \xi = (\xi_1, \ldots, \xi_{3N})^T, \quad \xi_i \sim N(0, \beta^{-i})$ for $i = 1, \ldots, 3N$, and $B \in \mathbb{R}^{3N \times 3N}$ an arbitrary matrix. The important features of (14) are the following:

(a) The linear system (14) is Hamiltonian with Hamiltonian function $$H = \frac{1}{2}(p^T M^{-1} p + \xi^T \xi) \quad (15)$$

and skew-symmetric structure matrix $$\mathcal{J} = \begin{bmatrix} 0_{3N} & -B \\ B^T & 0_{3N} \end{bmatrix} \quad (16)$$

(Leimkuhler & Reich, 2005).

(b) The solutions of (14) are time-reversible (Leimkuhler & Reich, 2005).

(c) The solutions of (14) conserve the canonical distribution $$\rho(p, \xi) \propto \exp\left(-\frac{\beta}{2}\{p^T M^{-1} p + \xi^T \xi\}\right). \quad (17)$$

Based on the formulation (14), the inventors use the linear differential equation $$\frac{dp}{ds} = -\sum_{k=1}^{K} \nabla_r h_k(r) \xi_k, \quad (18)$$

$$\frac{d\xi_k}{ds} = \nabla_r h_k(r) \cdot M^{-1} p, \quad k = 1, \ldots, K, \quad (19)$$

for the meso-GHMC method. Thus integration, or a numerical approximation of integration, is required to solve the equations and calculate the refreshed momentum. Here the position-dependent functions $h_k$ can be chosen arbitrarily. If, however, the functions $\{h_k\}$ are chosen to be Galilean invariant (i.e., invariant under translations and rotations of the coordinate system), then (18)-(19) conserve total linear and angular momentum and become suitable for meso-scale simulations. Specific choices for $\{h_k\}$ will be discussed in detail below in the context of dissipative particle dynamics.

To obtain a partial momentum refreshment, we seek the solutions at $s=\alpha$ for given initial conditions $$p(0)=p^0=p, \xi_k(0)=\xi_k^0=N(0,\beta^1), k=1, \ldots, K. \quad (20)$$

Let us denote the linear solution operator, generated by the solutions of (18)-(19), by $R(s) \in \mathbb{R}^{(3N+K) \times (3N+K)}$. The solution operator $R(s)$, $0 \leq s \leq \alpha$, has the following properties:

(a) The solutions of (18)-(19) are volume conserving, i.e., det $R(s)=1$.

(b) Given a fixed position vector r, the solutions of (18)-(19) are time reversible, i.e., $\mathcal{F} R(s) \mathcal{F} = R(-s)$. Here $\mathcal{F}$ denotes the linear involution operator that changes the sign of all $\xi_k$, $k=1, \ldots, K$.

(c) The solutions of (18)-(19) conserve the extended Hamiltonian/energy $$\mathcal{H}_{ext}(r, p, \{\xi_k\}) = \frac{1}{2}p^T M^{-1} p + V(r) + \frac{1}{2}\sum_{k=1}^{K} \xi_k^2 = \mathcal{H}(r, p) + \frac{1}{2}\xi^T \xi \quad (21)$$

for $r$=const.

(d) Property (c) immediately implies that the solutions of (18)-(19) conserve the extended canonical distribution $$\rho_{ext} \propto \exp(-\beta \mathcal{H}_{ext}), \quad (22)$$

i.e., $$\exp\left(-\beta \mathcal{H}(r, p(0)) - \beta/2 \sum_{k=1}^{K} \xi_k(0)^2\right) = \quad (23)$$

$$\exp\left(-\beta \mathcal{H}(r, p(s)) - \beta/2 \sum_{k=1}^{K} \xi_k(s)^2\right)$$

or, in more compact notation, $\rho_{ext} \circ R(s) = \rho_{ext}$.

We now consider the numerical implementation of (18)-(19). To do so we follow the standard hybrid Monte Carlo (HMC) methodology (Duane et al., 1987; Mehlig et al., 1992), integrating (18) and (19) and considering time-reversible and volume conserving (simplectic) propagators for the dynamics in p and $\{\xi_k\}$ with fixed position vector r. Two such methods will be considered: (i) an explicit one, which does not conserve (21), and (ii) an implicit one, which does conserve (21).

A first choice is provided by the application of the Störmer-Verlet method (see, e.g., Leimkuhler & Reich (2005)) to (18)-(19) and we obtain $$p^{j+1/2} = p^j - \frac{\Delta s}{2} \sum_{k=1}^{K} \nabla_r h_k(r) \xi_k^j, \quad (24)$$

-continued $$\xi_k^{j+1} = \xi_k^j + \Delta s \nabla_r h_k(r) \cdot M^{-1} p^{j+1/2}, \quad (25)$$
$$k = 1, \ldots, K,$$

$$p^{j+1} = p^{j+1/2} - \frac{\Delta s}{2} \sum_{k=1}^{K} \nabla_r h_k(r) \xi_k^{j+1}. \quad (26)$$

The numerical propagator (24)-(26) is applied over J>1 steps with step-size $\Delta s = \alpha/J$ and initial conditions (20). The final result, denoted by $p' = p^J$ and $\xi'_k = \xi_k^J$, k=1, ..., K, is accepted with probability $$P_{accept} = \min\left(1, \frac{\rho_{ext}(r, p', \{\xi'_k\})}{\rho_{ext}(r, p, \{\xi_k\})}\right). \quad (27)$$

In case of rejection, we continue with the initial p. In line with the standard HMC method, the $\{\xi'_k\}$ are entirely discarded after each completed momentum update step.

Note that $P_{accept} \to 1$ as $\Delta s \to 0$. This follows from the convergence of the numerical propagator to the exact $R(\alpha)$ as $\Delta s \to 0$. Hence, as a rule of thumb, we suggest to pick J large enough such that the rejection rate in (27) becomes negligible (e.g., less than 1%) for given $\alpha$.

An alternative propagator is obtained by applying the implicit midpoint rule (see, e.g. Leimkuhler & Reich (2005)) to (18)-(19) to obtain:

$$p' = p - \frac{\alpha}{2} \sum_{k=1}^{K} \nabla_r h_k(r)(\xi'_k + \xi_k), \quad (28)$$

$$\xi'_k = \xi_k + \frac{\alpha}{2} \nabla_r h_k(r) \cdot M^{-1}(p' + p), \quad (29)$$
$$k = 1, \ldots, K.$$

The resulting linear equations in $(p', \{\xi'_k\})$ can be solved by a simple fixed point iteration or some other iterative solver. The implicit midpoint rule is not commonly used, but the inventors have found an appealing aspect of its implementation (28)-(29) in that it conserves the extended energy (21) exactly and, hence, also the corresponding canonical distribution function (22). Since the method also conserves volume and is time-reversible, the proposed momenta p' are always accepted while the variables $\xi'_k$, k=1, ..., K, are entirely discarded after each momentum refreshment process. Thus for this preferred way of solving (18) and (19), no Metropolis acceptance step is necessary.

Because of the necessary fixed point iteration, the implicit midpoint method (28)-(29) is more expensive than the Störmer-Verlet method (24)-(26). However, we nevertheless recommend the implicit midpoint method for use in meso-GHMC because of the ideal acceptance probability $P_{accept}=1$.

The meso-GHMC method is defined through a Hamiltonian (1), inverse temperature $\beta=1/k_B T$, a set of position-dependent functions $\{h_k(r)\}_{k=1}^K$, time-step $\Delta t$, number of time-steps L, and parameter $\alpha$ for the momentum refreshment process. The method generates a sequence of position and momentum vectors $(r_j, p_j)$, j=1, ..., J. Set forth below is a summary of a single iteration of a preferred meso-GHMC method.

(i) Conservative dynamics process. Given the last accepted pair of position and momentum vectors $(r_j, p_j)$, we numerically integrate the Hamiltonian equations of motion (3) over L time-steps with the Störmer-Verlet method, (4)-(6), step-size $\Delta t$, and initial conditions $r^0 = r_j$, $p^0 = p_j$. This results in the approximation $(r^L, p^L)$. The accepted pair of position and momentum vectors (r, p) is obtained via a Metropolis accept/reject test of the form $$(r, p) = \begin{cases} (r^L, p^L) & \text{with probability } \min(1, \exp(-\beta \delta \mathcal{H})) \\ (r_j, p_j) & \text{otherwise,} \end{cases} \quad (30)$$

where $$\delta \mathcal{H} := \mathcal{H}(r^L, p^L) - \mathcal{H}(r_j, p_j). \quad (31)$$

(ii) Momentum refreshment process. A sequence of i.i.d. random numbers $\xi_k \sim N(0, \beta^{-1})$, k=1, ..., K, is generated. Using the implicit midpoint rule implementation of the momentum refreshment process, the system (28)-(29) is solved for $(p', \{\xi'_k\})$ by a fixed point iteration. Alternatively, the Störmer-Verlet method or another suitable method may be used in which case a Metropolis acceptance step is required.

(iii) The newly accepted pair of position and momentum vectors is provided by $r_{j+1} = r$ (from the conservative dynamics part) and $p_{j+1} = p'$ (from the momentum refreshment process), respectively.

We note that the conservative dynamics process is first in this example, but the momentum refreshment process could equally be first and/or could moreover be repeated before progressing to the conservative dynamics step (if the solution to (18) (19) is not obtained using the implicit midpoint method).

Under the assumption of ergodicity of the induced Markov chain, the ensemble average of an observable $\Omega(r, p)$ with respect to the canonical ensemble (2) is approximated as $$\langle \Omega \rangle = \frac{1}{J} \sum_{j=1}^{J} \Omega(r_j, p_j). \quad (32)$$

The Metropolis criterion (30) needs to be replaced by $$(r, p) = \begin{cases} (r^L, p^L) & \text{with probability } \min(1, \exp(-\beta \delta \mathcal{H})) \\ (r_j, -p_j) & \text{otherwise} \end{cases} \quad (33)$$

in case the conservative dynamics part is to be conducted with a momentum flip. No other parts of the algorithm need to be modified.

We emphasize again that both (30) as well as (33) lead to a Monte Carlo method satisfying a detailed balance relation with respect to the canonical density function.

Dissipative particle dynamics (DPD) has become a very popular method for meso-scale simulations of materials. Set forth below is a short summary of the method and discussion of linkage to the meso-GHMC method. The discussion will result in a new DPD Monte Carlo method, which we call Metropolis adjusted DPD (MetADPD).

Following the notation of Español & Warren (1995), the standard DPD method of Hoogerbrugge & Koelman (1992) can be formulated as a stochastic differential equation (SDE):

$$dr_i = \frac{p_i}{m_i}dt, \quad (34)$$

$$dp_i = \left[F_i - \gamma \sum_{j \neq i} \omega(r_{ij})(e_{ij} \cdot v_{ij})e_{ij}\right]dt + \sigma \sum_{j \neq i} \omega^{1/2}(r_{ij})e_{ij}dW_{ij}, \quad (35)$$

where $m_i$ is the mass of particle i with position vector $$r_i = (x_i, y_i, z_i)^T, r_{ij} = r_i - r_j, r_{ij} = |r_i - r_j|, e_{ij} = r_{ij}/r_{ij}, v_{ij} = v_i - v_j,$$
$$v_i = p_i/m_i,$$

and $F_i = -\nabla_{r_i} V(r)$ is the conservative force acting on particle i. The dimensionless weight function w(r) can be chosen in a rather arbitrary manner. However, to reproduce the constant temperature macro-canonical ensemble, the friction coefficient $\gamma$ and the noise amplitude $\sigma$ have to satisfy the fluctuation dissipation relation $$\sigma = \sqrt{2k_B T \gamma}. \quad (36)$$

Finally, $W_{ij}(t) = W_{ji}(t)$ are independent Wiener processes. Recall that the finite-time increments $\Delta W_{ij}(\tau) = W_{ij}(t+\tau) - W_{ij}(t)$ of a Wiener process are Gaussian distributed with mean zero and variance $\sqrt{\tau}$, i.e., $\Delta W_{ij}(\tau) \sim N(0, \tau)$.

Following Cotter & Reich (2003), let us write the equations (34)-(35) in a more compact and general manner:

$$dr = M^{-1}p\,dt, \quad (37)$$

$$dp = -\nabla_r V(r)dt - \sum_{k=1}^{K} \nabla_r h_k(r)[\gamma \dot{h}_k(r)dt + \sigma dW_k], \quad (38)$$

where r is the collection of the N particle position vectors $r_i$, p is the associated momentum vector, M is the diagonal mass matrix, $v = M^{-1}p$, V(r) is the potential energy, $$\dot{h}_k(r) = \nabla_r h_k(r) \cdot v = \nabla_r h_k(r) \cdot M^{-1}p, \quad (39)$$

and the functions $h_k(r)$, k=1, . . . , K, can be chosen quite arbitrarily.
The choice $$h_k(r) = \phi(r_{ij}), \phi'(r) = w^{1/2}(r), k=1, \ldots, K, \quad (40)$$

With K=(N−1)N/2 in (38) leads back to the standard DPD model. However, one can also set K=3N and $$h_i(r) = m_i^{1/2}x_i, h_{i+N}(r) = m_i^{1/2}y_i, h_{i+2N}(r) = m_i^{1/2}z_i, \quad (41)$$

i=1, . . . , N, in (38), which leads to the standard Langevin model (11). Yet another variant of (38) is obtained in the context of the Hamiltonian particle mesh (HPM) method (Frank & Reich, 2003; Frank et al., 2002), which itself is an application of the classical particle-in-cell (PIC) or particle-mesh methods (Hockney & Eastwood, 1988; Birdsall & Langdon, 1981) to geophysical fluid dynamics (GFD) (Salmon, 1999). Here the functions $h_k(r)$ would refer to some cell averaged quantity and k would be its cell index, where the cells are equivalent to the particles referred to previously. For example, the fluid density at a grid point $x_k$ can be approximated by $$h_k(r) = \sum_{i=1}^{N} m_i \psi(|x_k - r_i|), \quad (42)$$

with $\psi(r)$ some proper shape function such as a tensor product cubic B-spline. We finally mention an application to molecular dynamics (MD) suggested by Ma & Izaguirre (2003). Here the stochastic part of the dynamics is used to stabalize long-time step methods and the functions $h_k$ correspond to entries in the MD potential energy function. For example, if one would like to stabilize a bond stretching mode between atoms i and j, then $h_k(r) = |r_i - r_j|$.

The optimal numerical treatment of the DPD equations is still a subject of debate. See, for example, the publications (Pagonabarranga et al., 1998; Besold et al., 2000; Shardlow, 2003; Vattulainen et al., 2002; Peters, 2004; Hafskjold et al., 2004; Koopman & Lowe, 2006). In particular, it is found that the numerically observed temperature T* depends on the step-size $\Delta t$ and differs from the target temperature T. Methods are now available that to T*=T in the absence of conservative forces (Peters, 2004; Koopman & Lowe, 2006). However, none of the existing methods leads to T*=T under the full DPD dynamics.

We now discuss the connection between the newly proposed meso-GHMC method and DPD. Similar to the already discussed Langevin Monte Carlo algorithms (see §2.4), one can derive a DPD Monte Carlo algorithm from the meso-GHMC method by setting L=1 in the conservative dynamics part of the meso-GHMC. We also set $\alpha = (2\gamma \Delta t)^{1/2}$, $\gamma > 0$ the friction constant of DPD, in the momentum refreshment process and find that (28)-(29) reduce to $$p' - p \approx -\sum_{k=1}^{K} \nabla_r h_k(r)[\gamma \Delta t \nabla_r h_k(r) \cdot M^{-1}p + (2\gamma \Delta t)^{1/2}\xi_k], \quad (43)$$

$$r' - r = 0$$

to leading order in the step-size $\Delta t$.

Hence we may view the algorithm of §3.2 with L=1 as a splitting method (i.e., into the conservative dynamics part and the fluctuation-dissipation part, respectively) for (37)-(38) put into the framework of Monte Carlo methods. The resulting DPD Monte Carlo algorithm preserves the target temperature T and the associated canonical distribution (2) exactly. Furthermore, linear and angular momentum are conserved under suitable choices of the functions $\{h_k(r)\}$. We call the resulting Monte Carlo method the Metropolis adjusted DPD (MetADPD). This MetADPD is equivalent to meso-GHMC or meso-GSHMC (which is considered below), with L=1 and some truncation, as explained above. Therefore the corresponding considerations and advantages apply.

The key idea of the generalized shadow hybrid Monte Carlo (GSHMC) method of Akhmatskaya & Reich (2008) is to assess the Monte Carlo steps of GHMC with regards to a shadow Hamiltonian $\widehat{\mathcal{H}}_{\Delta t}$ (a high order approximation of a Hamiltonian), which increases the acceptance rate in the conservative dynamics part of GHMC. See Akhmatskaya & Reich (2006, 2008) for appropriate choice of the shadow Hamiltonian.

We now outline the generalization of meso-GHMC to GSHMC. We will call the resulting method meso-GSHMC. Again the momentum flip in the conservative dynamics part of GHMC can be eliminated based on the theoretical results of Gardiner, 2004. However, we also emphasise the conservative dynamics step of the original GSHMC method could be maintained if desired.

We now describe the modified momentum refreshment process.

To put the meso-GHMC method in the context of the GSHMC method of Akhmatskaya & Reich (2008), we need to modify the partial momentum update process, for example as defined by (28)-(29) (in case of the implicit midpoint implementation). The key idea is to replace the extended canonical density (22) by $$\hat{\rho}(r, p, \{\xi_k\}) = \exp\left(-\beta\hat{\mathcal{H}}_{\Delta t}(r, p) - \beta/2 \sum_{k=1}^{K} \xi_k^2\right), \quad (44)$$

and the acceptance probability (27) by $$P_{accept} = \min\left(\frac{\hat{\rho}(r, p', \{\xi'_k\})}{\hat{\rho}(r, p, \{\xi_k\})}\right). \quad (45)$$

Note that $P_{accept}=1$ for the implicit midpoint implementations (28)-(29) and $\hat{\mathcal{H}}_{\Delta t}=\mathcal{H}$. However, this is no longer the case for $\hat{\mathcal{H}}_{\Delta t}\neq\mathcal{H}$. This is a drawback of GSHMC, which can be partially overcome by GS2HMC (Akhmatskaya & Reich, 2008). In our context, this implies that the initial conditions $p^0$ in (20) gets replaced by $$p^0 = \Psi(r, p, \Delta t) \quad (46)$$

and p' is now defined implicitly by $$p' = \Psi(r, p', \Delta t) \quad (47)$$

where $\Psi(r, \cdot, \Delta t)$ is an appropriate transformation in the momentum vector p (Sweet et al., 2006; Akhmatskaya & Reich, 2008). An additional constraint on the choice of $\Psi$ is angular and linear momentum conservation under the resulting momentum refreshment process.

Since the meso-GSHMC method samples with respect to a modified canonical ensemble, it is necessary to reweight the computed samples $\{\Omega_j\}$ of an observable $\Omega=\Omega(r, p)$. See Akhmatskaya & Reich (2006, 2008) for details.

The meso-GSHMC method is defined through a Hamiltonian (1), a shadow Hamiltonian $\hat{\mathcal{H}}_{\Delta t}$, inverse temperature $\beta=1/k_BT$, a set of position-dependent functions $\{h_k(r)\}_{k=1}^{K}$, time-step $\Delta t$, number of time-steps L, and parameter $\alpha$ for the momentum refreshment process. The method generates a sequence of position and momentum vectors $(r_j, p_j)$, $j=1, \ldots, J$. Set forth below is a summary of a single iteration of the meso-GSHMC method.

(i) Conservative dynamics process. Given the last accepted pair of position and momentum vectors $(r_j, p_j)$, we numerically integrate the Hamiltonian equations of motion (3) over L time-steps with the Störmer-Verlet method, (4)-(6), step-size $\Delta t$, and initial conditions $r^0=r_j$, $p^0=p_j$. This results in the approximation $(r^L, p^L)$. The accepted pair of position and momentum vectors (r, p) is obtained via the Metropolis accept/reject test $$(r, p) = \begin{cases} (r^L, p^L) & \text{with probability min}(1, \exp(-\beta\delta\hat{\mathcal{H}})) \\ (r_j, p_j) & \text{otherwise} \end{cases}, \quad (48)$$

where $$\delta\hat{\mathcal{H}} := \hat{\mathcal{H}}_{\Delta t}(r^L, p^L) - \hat{\mathcal{H}}_{\Delta t}(r_j, p_j). \quad (49)$$

(ii) Momentum refreshment process. A sequence of i.i.d. random numbers $\xi_k \sim N(0,\beta^{-1})$, $k=1, \ldots, K$, is generated and using the implicit midpoint rule implementation of the momentum refreshment process, the system (28)-(29) is solved for (p', $\{\xi'_k\}$) by a fixed point iteration. The accepted momentum vector p" is obtained via $$p'' = \begin{cases} p' & \text{with probability min}(1, \exp(-\beta\delta\hat{\mathcal{H}}_{ext})) \\ p & \text{otherwise,} \end{cases} \quad (50)$$

where $$\delta\hat{\mathcal{H}}_{ext} := \left[\hat{\mathcal{H}}_{\Delta t}(r, p') + \frac{1}{2}\sum_{k=1}^{K}\xi'^2_k\right] - \left[\hat{\mathcal{H}}_{\Delta t}(r, p) + \frac{1}{2}\sum_{k=1}^{K}\xi^2_k\right]. \quad (51)$$

(iii) The newly accepted pair of position and momentum vectors is provided by $r_{j+1}=r$ (from the conservative dynamics part) and $p_{j+1}=p''$ (from the momentum refreshment process), respectively.

As before, the iterations could start with the momentum refreshment process or the conservative dynamics process and/or the refreshment process could be repeated a preferred number of times before the conservative dynamics process.

A Metropolis acceptance step may also be appropriate for the implicit midpoint method, because in meso-GSHMC, there is a deviation from the ideal acceptance probability $P_{accept}=1$, caused by the truncation.

Under the assumption of ergodicity of the induced Markov chain, the ensemble average of an observable $\Omega(r, p)$ with respect to the canonical ensemble (2) is approximated as $$\langle\Omega\rangle = \frac{\frac{1}{J}\sum_{j=1}^{J} w_j\Omega(r_j, p_j)}{\frac{1}{J}\sum_{j=1}^{J} w_j} \quad (52)$$

where $$w_j = \exp(\beta[\hat{\mathcal{H}}_{\Delta t}(r, p) - \mathcal{H}(r_j, p_j)]). \quad (53)$$

In case the conservative dynamics part is run with a momentum flip, the Metropolis criterion (48) needs to be replaced by $$(r, p) = \begin{cases} (r^L, p^L) & \text{with probability min}(1, \exp(-\beta\delta\hat{\mathcal{H}})) \\ (r_j, -p_j) & \text{otherwise} \end{cases} \quad (54)$$

No other parts of the algorithm need to be modified.

The numerical experiments are conducted for Model A and Model C of Vattulainen et al. (2002) because these models are well-defined and depict different situations.

Numerical results from the meso-GHMC/GSHMC methods are compared to the MD-VV implementation (Vettulainen et al., 2002) of DPD (for simplicity of presentation, we start with half a time-step in the positions:

$$q^{n+1/2} = q^n + \frac{\Delta t}{2} M^{-1} p^n, \quad (55)$$

$$p^{n+1} = p^n - \Delta t \nabla_r V(r^{n+1/2}) - \quad (56)$$
$$\sum_{k=1}^{K} \nabla_r h_k(r^{n+1/2})[\gamma \Delta t \nabla_r h_k(r^{n+1/2}) \cdot M^{-1} p^n + (2\gamma \Delta t)^{1/2} \xi_k],$$

$$q^{n+1} = q^{n+1/2} + \frac{\Delta t}{2} M^{-1} p^{n+1}, \quad (57)$$

where $\xi_k \sim N(0, \beta^{-1})$, $k=1, \ldots, K$ are i.i.d. random numbers.

We first summarize the two model systems. See Vattulainen et al. (2002) for more details; the relevant parts of this paper are incorporated by reference.

We consider a total of N=4000 particles with mass m=1 in a cubic domain of size 10×10×10 with periodic boundary conditions. The conservative forces are set equal to zero, i.e., the Hamiltonian (1) reduces to $$\mathcal{H} = \frac{1}{2} p^T p \quad (58)$$

and the resulting equations of motion can be solved exactly. Hence we formally use $\widehat{\mathcal{H}}_{\Delta t} = \mathcal{H}$ as a modified energy for meso-GSHMC and it is sufficient to only implement meso-GHMC for Model A. We always set L=1 in the conservative synamics part of meso-GHMC, i.e., $\tau = \Delta t$ and perform experiments for different values of the step-size $\Delta t$.

The functions $\{h_k(r)\}$ for the momentum refreshment process are defined via $$\phi'(r) = \begin{cases} 1 - r/r_c, & \text{for } r \leq r_c, \\ 0, & \text{for } r > r_c \end{cases} \quad (59)$$

in (40). The cutoff distance is set to equal $r_c = 1$. We also use $\alpha = (2\gamma \Delta t)^{1/2}$ for all Monte Carlo simulations with $\gamma = 4.5$.

The reference experiments with the DPD method (55)-(57) use the same parameter settings.

Model C is a simple interacting Lennard-Jones fluid with truncated pairwise interaction potential $$U(r_{ij}) = \begin{cases} 4\left[\left(\frac{l}{r_{ij}}\right)^{12} - \left(\frac{l}{r_{ij}}\right)^6\right], & r_{ij} \leq r_c, \\ 0, & r_{ij} > r_c \end{cases} \quad (60)$$

with $r_c=1$ and $l=2^{-1/6}$. The simulation box is of size 16×16×16 with a total of N=2867 particles. This corresponds to a density of $\rho=0.7$.

The conservative dynamics part is implemented with $\tau=0.05$ and varying values for $\Delta t$ and, hence $L=\tau/\Delta t$.

The momentum refreshment process is implemented as for Model A with the only difference being that $\alpha=(2\gamma\tau)^{1/2} \approx 4.4721$ for all Monte Carlo simulations with $\gamma=200$ ($\sigma=20$, respectively).

The meso-GSHMC method is implemented with a fourth-order accurate shadow Hamiltonian as $\widehat{\mathcal{H}} \Delta t$. See Akhmatskaya & Reich (2006) for a formulation of the shadow Hamiltonian. Note, however, that the truncated interaction potential (60) leads to a continuous only force field. Higher regularity of the force fields is required to achieve a fourth-order accuracy in the shadow Hamiltonian. The fourth-order behavior is indeed not observed in our numerical experiments. See Hafskjold et al. (2004) for the use of smoother truncation schemes in the context of DPD.

The reference experiments with the DPD method (55)-(57) use the same parameter settings.

We now discuss the numerical findings. We emphasize that all Monte Carlo simulations were conducted with a momentum flip in the conservative dynamics part.

The numerical results from the meso-GHMC and DPD simulations can be found in FIGS. 3-5.

FIG. 3 shows a radial distribution function $g(r/r_c)$ for different values of the step-size $\Delta t$ in model A. The analytic value is $g(r/r_c)=1$. Numerical results are obtained from a standard DPD integration scheme and the newly proposed meso-GHMC/GSHMC method for different values of the step-size $\Delta t$.

In FIG. 4 we also provide $(r/r_c)(g(r/r_c)-1)$ for the different step-sizes and methods to distinguish statistically from numerically induced deviations of $g(r/r_c)$.

Following the arguments of Peters (2004), FIG. 4 thus demonstrates that the deviations of the numerically computed radial distribution function $g(r/r_c)$ from its exact value g=1 is of purely statistical origin (finite sample size) for the meso-GHMC method. The same does not hold for the DPD method unless $\Delta t \leq 0.05$. We also note that the meso-GHMC method exactly reproduces the target inverse temperature $\beta=1$ for all values of $\Delta t$, while the DPD method (55)-(57) leads to a nearly linear increase in the numerically observed temperature with respect to the step-size $\Delta t$.

FIG. 5 shows the numerically observed temperature $\langle k_B T \rangle$ vs the step-size $\Delta t$ in Model A. Results are obtained from a standard DPD integration scheme and the newly proposed meso-GHMC/GSHMC method. The correct result is $\langle k_B T \rangle = 1$.

FIG. 6 shows the radial distribution function $g(r/r_c)$ for different values of the step-size $\Delta t$ in model C. Results are obtained from a standard DPD integration scheme and the newly proposed meso-GHMC/GSHMC methods.

We conclude from FIG. 6 that the computed radial distribution functions are in nearly perfect agreement for all simulation methods and step-sizes $\Delta t$. Note, however, that Vattulainen et al. (2002) do not specify the number of particles for Model C and, hence, our numerical results may differ slightly from the findings in Vattulainen et al. (2002).

FIG. 7 shows the numerically observed temperature $\langle k_B T \rangle$ vs the step-size $\Delta t$ in Model C. Results are obtained from a standard DPD integration scheme and the newly proposed meso-GHMC/GSHMC methods. The correct result is $\langle k_B T \rangle = 1$.

We therefore confirm in FIG. 7 that the Monte Carlo methods exactly reproduce the target inverse temperature $\beta=1$.

We finally state the rejection rates for meso-GHMC and meso-GSHMC in Table 1 below. The meso-GSHMC slightly reduces the rejection rate in the conservative dynamics part. This is at the expense of a non-zero rejection rate in the momentum refreshment process. It appears that the meso-GHMC method is optimal for force fields with a non-smooth cut-off. A smooth truncation of the force field has been discussed by Hafskjold et al. (2004) in the context of DPD.

TABLE 1

Rejection rates in the conservative dynamics (CD) and momentum refreshment (MR) steps of meso-GHMC and meso-GSHMC, respectively, for different values of the step-size $\Delta t$ and the contant $\tau = L\Delta t = 0.05$.

| method | step-size | rejection rate in CD step | rejection rate in MR step |
| --- | --- | --- | --- |
| meso-GHMC | 0.0025 | 1.65% | 0% |
| meso-GSHMC | 0.0025 | 1.28% | 0.11% |
| meso-GHMC | 0.0100 | 26.51% | 0% |
| meso-GSHMC | 0.0100 | 20.64% | 1.64% |

We have described embodiments which include an extension of the GHMC/GSHMC method to a momentum refreshment process which respects the Galilean invariance of the underlying conservative dynamics. It has been demonstrated that these embodiments (referred to as meso-GHMC and meso-GSHMC) reproduce thermodynamic quantities correctly and independently of the step-size $\Delta t$ for the conservative dynamics part. This is in contrast to standard stochastic dynamics implementations of DPD. The Galilean invariance of the momentum refreshment process is important for non-equilibrium computations (conservation of linear and angular momentum) and for sampling (reduced artificial viscosity).

Below we outline possible implementations of invention embodiments referred to as meso-GHMC/meso-GSHMC in the context of massively parallel computing facilities and potential application areas within meso-scale simulation tools.

There are at least four immediate strategies to put Monte-Carlo methods such as meso-GHMC/meso-GSHMC into the context of massively parallel computing. The first is to use massively parallel implementations of the necessary force field calculations. This is easy to achieve whenever the force field is short-range (as is often the case for DPD). More sophisticated strategies are required for long-range interactions (such as electrostatics). See, for example, the fast multiple algorithms of Greengard & Rokhlin (1987). The second application arises when Monte Carlo chains are conducted in parallel and independently. The final two strategies arise as refinements of this "trivial" (but often very useful) exploitation of parallelism. We describe them in some detail next. We wish to emphasize that these four strategies can be combined within a single implementation to produce multi-level parallel algorithms.

In parallel tempering (see, for example, Liu (2001)), the target distribution is embedded into a larger system which hosts a number of similar distributions differing from each other only in temperature parameters. In our context, the obvious choice is to consider a family of canonical distributions $$\rho_i \propto \exp(-\beta_i H), \quad (61)$$

where $\beta_i = 1/k_B T_i$, $T_i$ a sequence of temperature with target temperature $T = T_{i_*}$ for an appropriate index $i_*$ and H is the Hamiltonian. Then, parallel GHMC/GSHMC are conducted to sample from these distributions $\rho_i$ independently. These multiple distributions are connected by proposing an occasional configuration exchange between two adjacent (in temperature) sampling Monte Carlo chains. Parallel tempering allows "large" configurational moves at "high" temperature, which can get inserted into lower temperature ensembles via exchange steps. However, to allow a sufficient number of successful exchanges between adjacent densities, the densities must overlap strongly. See Liu (2001) for more details and Brenner et al. (2007) for recent improvements of the method in the context of molecular dynamics.

Note that temperature T could be replaced by another parameter in a parallel tempering method. Hence parallel tempering could also be used for free energy calculations within the thermodynamic integration framework.

We finally mention the orientational bias Monte Carlo (OBMC) (or multiple-try Metropolis) method as a means to enhance the acceptance rate in the momentum refreshment of shadow hybrid Monte Carlo methods. The OBMC method provides a rigorous means to exploit multiple (parallel) proposals within a Monte Carlo context. See Liu (2001) for a description of the OBMC method.

The basic idea (put into the context of GSHMC) is to generate k trial momentum vectors $p_i$, i=1, ..., k given a momentum vector p. Select $\bar{p}=p_l$ among the momentum vectors $\{p_i\}$ with probability $\pi(p_i)$ proportional to the target distribution, i.e., $\pi(p_i) \propto \exp(-\beta \widehat{\mathcal{H}}_{ext})$. Next we generate another k−1 reference points $\{\hat{p}_i\}$ using the momentum proposal step with $\bar{p}$ as the initial value. Set $\hat{p}_k = p$. Finally accept $\bar{p}$ with probability $$\min\left\{1, \frac{\sum_{i=1}^{k} \pi(p_i)}{\sum_{i=1}^{k} \pi(\hat{p}_i)}\right\} \quad (62)$$

and reject with the remaining probability.

Particle-based meso-scale models, suitable for meso-GHMC/GSHMC, can be found in a wide range of application areas including colloid-polymer systems, membranes and micro/nano channels, dynamic wetting, and liposome formation. Bionanotechnology is a particularly important area of application and covers, for example, drug delivery and therapeutics (including nanoscale assembly of liposomes and dendriners, and cholesterol removal); screening using membrane simulation; and bioanalysis (including nanoparticle transport and microfluids to nanofluids). Another area of application is soft nanotechnology, the design and application of soft materials with nanoscale structures. Soft particles such as surfactants, block copolymers and proteins can be studied to predict the self assembly structures from nanometers to microns in size. Such simulations are of use in the food, oil, paint and cosmetic industries. Meso-GHMC/GSHMC is amenable to massively parallel computing and can contribute to solving many important environmental problems such as local weather forecasting, global climate predictions, nuclear waste remediation. The invention embodiments also have use in permeation and separation of toxic solutes, developing environmentally friendly new materials, and low-carbon energy generation.

Besides meso-scale simulations, we anticipate that meso-GHMC/GSHMC will be of interest for free energy calculations. The potential advantage of meso-GHMC/GSHMC over GHMC/GSHMC lies in the reduced artificial viscosity of the Galilean invariant momentum update (Koopman & Lowe, 2006).

In any of the above aspects, the various features may be implemented in hardware, or as software modules running on one or more processors. Features of one aspect may be applied to any of the other aspects.

The invention also provides a computer program or a computer program product for carrying out any of the methods described therein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

Appropriate hardware includes a CPU for executing a program providing the simulation (including processor parts carrying out the momentum refreshment process and the conservative dynamics process), a memory for story the program executed by the CPU, a hard disk for recording the program and the data, a CRT for displaying the information to the user, a keyboard for the user to input the data, a mouse for the user to manipulate menus and icons on the CRT, and a communication interface for network connections.

As mentioned above, embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A computer-implemented method of simulating behaviour of a thermodynamic system under influence of a force field over time, comprising:
   initially accepting input of simulation conditions and simulation parameters, the simulation conditions including at least one of volume, mass, temperature, pressure, number of particles, and total energy, and the simulation parameters including at least one of a time step in conservative dynamics, a number of conservative dynamics iterations, a starting position and a starting momentum for a first operation in the method, and force field parameters;
   executing, by a computer, a momentum refreshment process and a conservative dynamics process, the momentum refreshment process including:
      defining a refreshed momentum by partially refreshing a momentum in accordance with the starting position and the starting momentum of a model;
      using the starting momentum or the refreshed momentum as a resulting momentum and using the starting position as a resulting position; and
      outputting the results in a form of a radial distribution function.

2. The method according to claim 1, wherein a starting position r and a starting momentum p of the model is provided, the partially refreshing of the momentum defines refreshed momentum p' by considering solutions for p' determined by a numerical implementation for integrating a generating linear differential equation $$\frac{dp}{ds} = -\sum_{k=1}^{K} \nabla_r h_k(r) \xi_k,$$

$$\frac{d\xi_k}{ds} = \nabla_r h_k(r) \cdot M^{-1} p,$$

$$k = 1, \ldots, K,$$

where
$\nabla_r h_k$ is the gradient of $h_k(r)$,
$h_k(r)$ is a selected Galilean-invariant, position-dependent function
$\xi_k \sim N(0, \beta^{-1})$, $K \leq 3N$ can be chosen; $\xi = (\xi_1, \ldots \xi_K)^T$,
N is the number of particles,
$N(0, \beta^{-1})$ denotes the normal distribution with zero mean and variance of $\beta^{-1}$,
$\beta = 1/K_B T$ where T is temperature $0 < s \leq \pi/2$, and
M is the mass matrix
to seek solutions for given initial conditions $$p(0) = p^0 = p, \xi_n(0) = \xi_k^0 = N(0, \beta^{-1}), k = 1, \ldots, K$$

and using the starting momentum p or refreshed momentum p' as the resulting momentum p and using the starting position r as the resulting position r.

3. The method according to claim 1, wherein the conservative dynamics process is implemented including:
   running a conservative dynamics simulation over a fixed number of iterations L and obtaining new position r' and new momentum p', given the starting position r and the starting momentum p of a system;
   evaluating the Hamiltonian H at position r' and momentum p' after the conservative dynamics simulation; and
   accepting or rejecting a new system configuration produced by the conservative dynamics simulation according to a Metropolis-type function and, upon acceptance of the new system configuration, using r' as the resulting position r and p' as the resulting momentum p or, upon rejection of the new system configuration, using the original starting position r as the resulting position r and keeping or negating an original starting momentum p to give the resulting momentum p.

4. The method according to claim 1, wherein either the momentum refreshment or the conservative dynamics process is the first operation, and the resulting position r and resulting momentum p of the first operation provides the starting position r and starting momentum p for a second operation.

5. The method according to claim 4, wherein the first operation is the momentum refreshment.

6. The method according to claim 1, wherein the method is repeated in entirety.

7. The method according to claim 1, wherein the refreshed momentum p' is accepted or rejected according to a Metropolis-type function, and upon acceptance of p', using p' as the resulting momentum p and starting position r as the resulting position r or upon rejection of the p', using starting momentum p as the resulting momentum p and starting position r as the resulting position.

8. The method according to claim 1, wherein the momentum refreshment operation constitutes multiple momentum refreshments, in which an entire momentum refreshment operation is repeated a selected number of times consecutively, to provide a final resulting momentum, which may be accepted or rejected accordingly to a Metropolis-type function.

9. The method according to claim 1, wherein $s=(2\gamma\Delta t)^{1/2}$, $\gamma>0$ where $\gamma$ is the friction constant of DPD and L=1, so that a Metropolis adjusted DPD algorithm results for use in the simulation.

10. The method according to claim 1, wherein a shadow Hamiltonian $H_{\Delta t}$ is used for evaluation, and calculated properties are re-weighted at an end of the entire method.

11. The method according to claim 10, wherein $$p^0 = \Psi(r, p, \Delta t)$$

and p' is defined implicitly by $$p' = \Psi(r, p', \Delta t)$$

where $\Psi(r, \cdot, \Delta t)$ is an appropriate transformation in the momentum vector p.

12. The method according to claim 2, wherein a generating linear differential equation is solved using the implicit midpoint rule.

13. The method according to claim 11, wherein the refreshed momentum p' is accepted automatically without a Metropolis acceptance step.

14. The method according to claim 1, wherein a detailed balance of probabilities is carried out in the conservative dynamics process and an accepted pair of position and momentum vectors (r, p) is obtained via a Metropolis accept/reject test of the form $$(r, p) = \begin{cases} (r^L, p^L) & \text{with probability } \min(1, \exp(-\beta\delta\mathcal{H})) \\ (r_j, -p_j) & \text{otherwise,} \end{cases}$$

where $$\delta\mathcal{H} := \mathcal{H}(r^L, p^L) - \mathcal{H}(r_j, p_j),$$

and H is either a Hamiltonian or a shadow Hamiltonian.

15. The method according to claim 1, wherein a modified detailed balance of probabilities is carried out in the conservative dynamics process and the accepted pair of position and momentum values (r, p) is obtained via a Metropolis accept/reject test of the form $$(r, p) = \begin{cases} (r^L, p^L) & \text{with probability } \min(1, \exp(-\beta\delta\mathcal{H})) \\ (r_j, -p_j) & \text{otherwise} \end{cases}$$

where $$\delta\mathcal{H} := \mathcal{H}(r^L, p^L) - \mathcal{H}(r_j, p_j).$$

16. The method according to claim 1, wherein Newton's equation of motion in the conservative dynamics process is solved using a time reversible and symplectic method.

17. The method according to claim 16, wherein one of the generalized Störmer-Verlet method, or the standard Störmer-Verlet method is used.

18. The method according to claim 1, wherein a conservative dynamics iteration includes describing forces on particles of a thermodynamic system using a chosen force field, integrating Newton's equation to predict positions and velocities at a new time and recalculation of the forces.

19. The method according to claim 1, wherein simulation conditions provided correspond to a thermodynamic ensemble, and conservative, dissipative and fluctuation forces between particles in the model are taken into consideration to conserve Galilean invariance.

20. The method according to claim 1, wherein the simulation parameters include:
a number of repetitions of the momentum refreshment process and conservative dynamics process, an order of shadow Hamiltonians used, a set of position dependent Galilean invariant functions and the constants for momentum refreshment.

21. The method according to claim 1, comprising:
displaying the results on a screen or printout.

22. A method of molecular simulation of a system over time, comprising:
modeling the system using a particle-based model in which each particle represents a group of atoms;
carrying out the method of simulating behavior of a thermodynamic system according to claim 1; and
analyzing results obtained from the simulation and relating the results to macroscopic level properties.

23. The method according to claim 22, comprising:
using the relationship of the results to the macroscopic level properties to assess and optionally modify the system at the macroscopic level, before repeating the method on the modified system.

24. The method according to claim 1, wherein the partially refreshing momentum is carried out by considering solutions for a starting momentum determined by a numerical implementation for integrating a generating linear differential equation.

25. An apparatus which simulates behavior of a thermodynamic system under influence of a force field over time, comprising: a processor;
a memory having stored therein instructions to cause the processor to execute an operation including:
initially accepting input of simulation conditions and simulation parameters, the simulation conditions including at least one of volume, mass, temperature, pressure, number of particles, and total energy, and the simulation parameters including at least one of a time step in conservative dynamics, a number of conservative dynamics iterations, the starting position and a starting momentum for a first operation in the method, and force field executing parameters;
executing a partial momentum refreshment processing using the input parameters and conditions and executing a conservative dynamics processing using the input parameters and conditions, and
wherein the partial momentum refreshment processing part is operable, given a starting position r and a starting momentum p of the model, to refresh a momentum and define refreshed momentum p' by considering solutions for p' determined by a numerical implementation for integrating a generating linear differential equation $$\frac{dp}{ds} = -\sum_{k=1}^{K} \nabla_r h_k(r)\xi_k,$$

$$\frac{d\xi_k}{ds} = \nabla_r h_k(r) \cdot M^{-1} p,$$

$$k = 1, \ldots, K,$$

where
$\nabla_r h_k$ is the gradient of $h_k(r)$,
$h_k(r)$ is a selected Galilean-invariant, position-dependent function
$\xi_k \sim N(0,\beta^{-1})$, $K \leq 3N$ can be chosen; $\xi=(\xi, \ldots \xi_K)^T$,
N is the number of particles,
$N(0, \beta^{-1})$ denotes the normal distribution with zero mean and variance of $\beta^{-1}$,
$\beta = 1/K_B T$ where T is temperature
$0 < s \leq \pi/2$, and
M is the mass matrix
to seek solutions for given initial conditions $$p(0)=p^0=p, \xi_n(0)=\xi_k^0=N(0,\beta^{-1}), k=1,\ldots,K$$

and using the starting momentum p or refreshed momentum p' as the resulting momentum p and using the starting position r as the resulting position r; and outputting the results in a form of a radial distribution function.

26. A non-transitory computer-readable recording medium storing a computer program which, when executed on a processor, carries out an operation including simulating behaviour of a thermodynamic system under influence of a force field over time, comprising:

initially accepting input of simulation conditions and simulation parameters, the simulation conditions including at least one of volume, mass, temperature, pressure, number of particles, and total energy, and the simulation parameters including at least one of a time step in conservative dynamics, a number of conservative dynamics iterations, a starting position and a starting momentum for a first operation in the method, and force field parameters executing a momentum refreshment process and a conservative dynamics process, the momentum refreshment process including:

defining a refreshed momentum by partially refreshing a momentum in accordance with the starting position and the starting momentum of a model;

using the starting momentum or the refreshed momentum as a resulting momentum and using the starting position as a resulting position; and outputting the results in a form of a radial distribution function.

27. The non-transitory computer-readable recording medium according to claim 26, wherein a starting position r and a starting momentum p of the model is provided, the partially refreshing of the momentum defines refreshed momentum p' by considering solutions for p' determined by a numerical implementation for integrating a generating linear differential equation $$\frac{dp}{ds} = -\sum_{k=1}^{K} \nabla_r h_k(r) \xi_k,$$

$$\frac{d\xi_k}{ds} = \nabla_r h_k(r) \cdot M^{-1} p,$$

$$k = 1, \ldots, K,$$

where
$\nabla_r h_k$ is the gradient of $h_k(r)$,
$h_k(r)$ is a selected Galilean-invariant, position-dependent function
$\xi_k \sim N(0,\beta^{-1})$, $K \leq 3N$ can be chosen; $\xi=(\xi, \ldots \xi_K)^T$,
N is the number of particles,
$N(0, \beta^{-1})$ denotes the normal distribution with zero mean and variance of $\beta^{-1}$,
$\beta = 1/K_B T$ where T is temperature
$0 < s \leq \pi/2$, and
M is the mass matrix
to seek solutions for given initial conditions $$p(0)=p^0=p, \xi_n(0)=\xi_k^0=N(0,\beta^{-1}), k=1,\ldots,K$$

and using the starting momentum p or refreshed momentum p' as the resulting momentum p and using the starting position r as the resulting position r.

* * * * *

UNITED STATES PATENT AND TRADEMARK OFFICE
CERTIFICATE OF CORRECTION

PATENT NO. : 8,452,576 B2
APPLICATION NO. : 12/508716
DATED : May 28, 2013
INVENTOR(S) : Sebastian Reich et al.

Page 1 of 1

It is certified that error appears in the above-identified patent and that said Letters Patent is hereby corrected as shown below:

Title Page Col. 2 Item 56 (Other Publications), Line 4, Delete "Unties" and insert -- United --, therefor.

Title Page 2 Col. 1 Item 56 (Other Publications), Line 19, Delete "Hark" and insert -- Harik --, therefor.

Title Page 2 Col. 2 Item 56 (Other Publications), Line 43, Delete "Modem" and insert -- Modern --, therefor.

In the Claims

Column 23, Line 49 (Approx.), In Claim 15, delete "–pj)" and insert -- pj) --, therefor.

Signed and Sealed this
Twenty-fourth Day of September, 2013

Teresa Stanek Rea
*Deputy Director of the United States Patent and Trademark Office*